(12) United States Patent
Cho et al.

(10) Patent No.: US 10,909,836 B2
(45) Date of Patent: Feb. 2, 2021

(54) DEVICE FOR PREVENTING MOBILE PHONE LOSS THROUGH REDUCTION OF FALSE ALARMS AND METHOD FOR PROVIDING ALARMS FOR MOBILE PHONE LOSS PREVENTION

(71) Applicant: Center for Integrated Smart Sensors Foundation, Daejeon (KR)

(72) Inventors: Hyun Tae Cho, Daejeon (KR); Dong Sam Ha, Daejeon (KR)

(73) Assignee: Center for Integrated Smart Sensors Foundation, Daejeon (KR)

( * ) Notice: Subject to any disclaimer, the term of this patent is extended or adjusted under 35 U.S.C. 154(b) by 0 days.

(21) Appl. No.: 16/441,315

(22) Filed: Jun. 14, 2019

(65) Prior Publication Data

US 2020/0242912 A1    Jul. 30, 2020

(30) Foreign Application Priority Data

Jan. 30, 2019    (KR) .......................... 10-2019-0011924

(51) Int. Cl.
*G08B 21/24*    (2006.01)
*H04W 4/029*    (2018.01)

(52) U.S. Cl.
CPC ............ *G08B 21/24* (2013.01); *H04W 4/029* (2018.02)

(58) Field of Classification Search
CPC ........ G08B 21/24; H04W 4/029; H04W 4/80; H04W 4/023; H04M 1/7253
USPC ............ 340/539.11, 539.13, 539.15, 539.21, 340/539.26, 539.32, 541, 542, 568.1, 571, 340/573.4, 686.6
See application file for complete search history.

(56) References Cited

U.S. PATENT DOCUMENTS

| | | | | |
|---|---|---|---|---|
| 6,133,830 A | * | 10/2000 | D'Angelo | .......... G08B 13/1409 340/539.1 |
| 7,696,887 B1 | * | 4/2010 | Echavarria | ......... G08B 21/0227 340/573.1 |
| 9,911,301 B1 | * | 3/2018 | Foley | ................. G08B 21/0275 |
| 10,032,358 B2 | * | 7/2018 | Raniere | .................. G08B 13/14 |

(Continued)

FOREIGN PATENT DOCUMENTS

KR    10-2012-0027509 A    3/2012
KR    10-2014-0113118 A    9/2014
(Continued)

*Primary Examiner* — Adnan Aziz
(74) *Attorney, Agent, or Firm* — Wolf, Greenfield & Sacks, P.C.

(57) ABSTRACT

A device for preventing mobile phone loss for reducing the times of erroneous occurrences of an alarm, and to a method for providing an alarm for mobile phone loss prevention are disclosed. A device for preventing mobile phone loss according to an embodiment of the inventive concept includes a receiving unit that receives a predetermined signal from a pre-registered tag, a calculating unit that calculates a distance between a mobile phone and the tag based on the received signal, a controller that determines whether the mobile phone is in a predetermined safe place, and an alarm providing unit that provides an alarm for preventing the mobile phone loss based on whether the mobile phone is in the safe place and whether the calculated distance is equal to or greater than a predetermined reference distance.

6 Claims, 5 Drawing Sheets

(56) References Cited

U.S. PATENT DOCUMENTS

| | | | | |
|---|---|---|---|---|
| 2006/0063563 A1* | 3/2006 | Kaufman | .............. | H04M 1/663 |
| | | | | 455/556.2 |
| 2007/0037605 A1* | 2/2007 | Logan | ................ | H04M 3/42229 |
| | | | | 455/567 |
| 2010/0267361 A1* | 10/2010 | Sullivan | .................. | G01S 19/17 |
| | | | | 455/404.2 |
| 2011/0121964 A1* | 5/2011 | Bannard | ................. | G08B 21/24 |
| | | | | 340/539.13 |
| 2012/0238330 A1* | 9/2012 | Wu | ..................... | H04M 1/7253 |
| | | | | 455/569.1 |
| 2013/0005354 A1* | 1/2013 | Sheilendra | ............ | H04W 4/029 |
| | | | | 455/456.1 |
| 2013/0124463 A1* | 5/2013 | Lee | ......................... | G06F 16/27 |
| | | | | 707/610 |
| 2014/0073262 A1* | 3/2014 | Gutierrez | ............... | G08B 13/22 |
| | | | | 455/67.11 |
| 2014/0173439 A1* | 6/2014 | Gutierrez | ............... | G08B 21/24 |
| | | | | 715/727 |
| 2014/0266698 A1* | 9/2014 | Hall | ...................... | H04W 4/021 |
| | | | | 340/539.13 |
| 2015/0126234 A1* | 5/2015 | Rodriguez | ............. | G08B 13/22 |
| | | | | 455/457 |
| 2018/0189913 A1* | 7/2018 | Knopp | .................... | H04W 4/90 |
| 2019/0378391 A1* | 12/2019 | Miniard | ................ | H04W 4/023 |

FOREIGN PATENT DOCUMENTS

| | | | | |
|---|---|---|---|---|
| KR | 20-0483108 | | 4/2017 | |
| WO | WO-0122379 A1 * | 3/2001 | ......... | G08B 21/0294 |

\* cited by examiner

DEVICE FOR PREVENTING MOBILE PHONE LOSS THROUGH REDUCTION OF FALSE ALARMS AND METHOD FOR PROVIDING ALARMS FOR MOBILE PHONE LOSS PREVENTION

CROSS-REFERENCE TO RELATED APPLICATIONS

A claim for priority under 35 U.S.C. § 119 is made to Korean Patent Application No. 10-2019-0011924 filed on Jan. 30, 2019, in the Korean Intellectual Property Office, the entire contents of which are hereby incorporated by reference.

BACKGROUND

Embodiments of the inventive concept described herein relate to preventing mobile phone loss, and more particularly, relate to a device for preventing mobile phone loss in which occurrences of false alarms for mobile phone loss prevention may be reduced, and to a method for providing alarms for mobile phone loss prevention.

With development of speed of data transmission through a mobile phone, a new era in which the mobile phone functions as a personal data processing terminal which is called a smart phone beyond a communication device has come. In addition, the mobile phone itself has become a high-end electronic product. The mobile phone has also become a target of theft crime because a user could change the mobile phone simply by changing a USIM chip.

The mobile phone is one of the items that may be easily lost due to not only crime but also user's carelessness. Thus, a key of preventing mobile phone loss, even though a mobile phone is lost, is to allow an owner of the mobile phone to recognize that the mobile phone is lost within a short period of time via a separate device for preventing loss, and to receive the mobile phone back.

In a case of the mobile phone, various short-range communication modules may be provided together with a communication module for a telecommunication and a communication module for data communication. A representative short-range communication standard is Bluetooth communication. A technology for establishing short-range communication between the mobile phone and a portable terminal device via the Bluetooth communication has been provided.

A conventional technology for preventing mobile phone loss according to one embodiment provides an alarm when a user is apart from a mobile phone by a certain distance. The corresponding conventional technology provides the alarm even if the user is in a safe place such as a house, company, and the like, thereby causing inconveniences to the user. In order to eliminate such inconveniences, the alarm function should be deactivated in a safe place.

Therefore, a need for a device or a method for preventing mobile phone loss that may reduce false alarms is on the rise.

SUMMARY

Embodiments of the inventive concept provide a device for preventing mobile phone loss in which occurrences of false alarms to a user for mobile phone loss prevention occur may be reduced, and provide a method for providing alarms for mobile phone loss prevention.

Embodiments of the inventive concept provide a device for preventing mobile phone loss that may automatically deactivate the alarm function for preventing mobile phone loss in safe places set by a user to reduce occurrences of false alarms for preventing mobile phone loss, and provide a method for providing alarms for mobile phone loss prevention.

According to an exemplary embodiment, a device for preventing mobile phone loss includes a receiving unit that receives predetermined signal from a pre-registered tag, a calculating unit that calculates a distance between a mobile phone and the tag based on the received signal, a controller that determines whether the mobile phone is in a predetermined safe place, and an alarm providing unit that provides an alarm for preventing the mobile phone loss based on whether the mobile phone is in the safe place and whether the calculated distance is equal to or greater than a predetermined reference distance.

According to an exemplary embodiment, the controller may determine whether the mobile phone is in the safe place based on at least one of address information or identification (ID) information of WIFI, Bluetooth connection information, or location information pre-registered by a user of the mobile phone.

According to an exemplary embodiment, when the mobile phone is determined to be in a place other than the safe place, and the calculated distance is equal to or greater than the reference distance, the alarm providing unit may generate the alarm for preventing the phone loss.

According to an exemplary embodiment, when the mobile phone is determined to be in the safe place, the controller may deactivate the alarm for preventing the phone loss.

According to an exemplary embodiment, the controller may set different threshold values of volumes of alarms for preventing the loss between different safe places. In addition, when the mobile phone is determined to be in a safe place, and the calculated distance is equal to or greater than the reference distance, the alarm providing unit may provide a corresponding alarm at a volume of a threshold value set for a corresponding safe place.

According to an exemplary embodiment, the controller may determine whether the tag is in a stationary state based on the signal received from the tag for a predetermined time. When the tag is determined to be in the stationary state, the controller may deactivate the alarm for preventing the loss.

According to an exemplary embodiment, when the controller receives a password predetermined about the mobile phone from another mobile phone, the controller may activate the alarm for preventing the loss to provide the alarm for preventing the loss using the alarm providing unit.

According to an exemplary embodiment, the controller may provide location information of the mobile phone to the another mobile phone.

According to an exemplary embodiment, a method for providing an alarm for mobile phone loss prevention includes receiving a predetermined signal from a pre-registered tag, calculating a distance between a mobile phone and the tag based on the received signal, determining whether the mobile phone is in a predetermined safe place, and providing an alarm for preventing the mobile phone loss based on whether the mobile phone is in the safe place and whether the calculated distance is equal to or greater than a predetermined reference distance.

According to an exemplary embodiment, the determining of whether the mobile phone is in the predetermined safe place may include determining whether the mobile phone is in the safe place based on at least one of address information or identification (ID) information of WIFI, Bluetooth connection information, or location information pre-registered by a user of the mobile phone.

According to an exemplary embodiment, the providing of the alarm for preventing the mobile phone loss may include providing the alarm for preventing the loss when the mobile phone is determined to be in a place other than the safe place, and the calculated distance is equal to or greater than the reference distance.

According to an exemplary embodiment, the method may further include deactivating the alarm for preventing the loss when the mobile phone is determined to be in the safe place.

According to an exemplary embodiment, the method may further include setting different threshold values of volumes of alarms for preventing the loss between different safe places. The providing of the alarm for preventing the loss may include providing a corresponding alarm at a volume of a threshold value set for a corresponding safe place when the mobile phone is determined to be in a safe place, and the calculated distance in equal to or greater than the reference distance.

According to an exemplary embodiment, the method may further include determining whether the tag is in a stationary state based on the signal received from the tag for a predetermined time, and deactivating the alarm for preventing the loss when the tag is determined to be in the stationary state.

According to an exemplary embodiment, the providing of the alarm for preventing the loss may include activating the alarm for preventing the loss to provide the alarm for preventing the loss when a predetermined password for the mobile phone is received from another mobile phone.

According to an exemplary embodiment, the method may further include providing location information of the mobile phone to the another mobile phone.

BRIEF DESCRIPTION OF THE FIGURES

The above and other objects and features become apparent from the following description with reference to the following figures, wherein like reference numerals refer to like parts throughout the various figures unless otherwise specified, and wherein.

DETAILED DESCRIPTION

Figure 1:
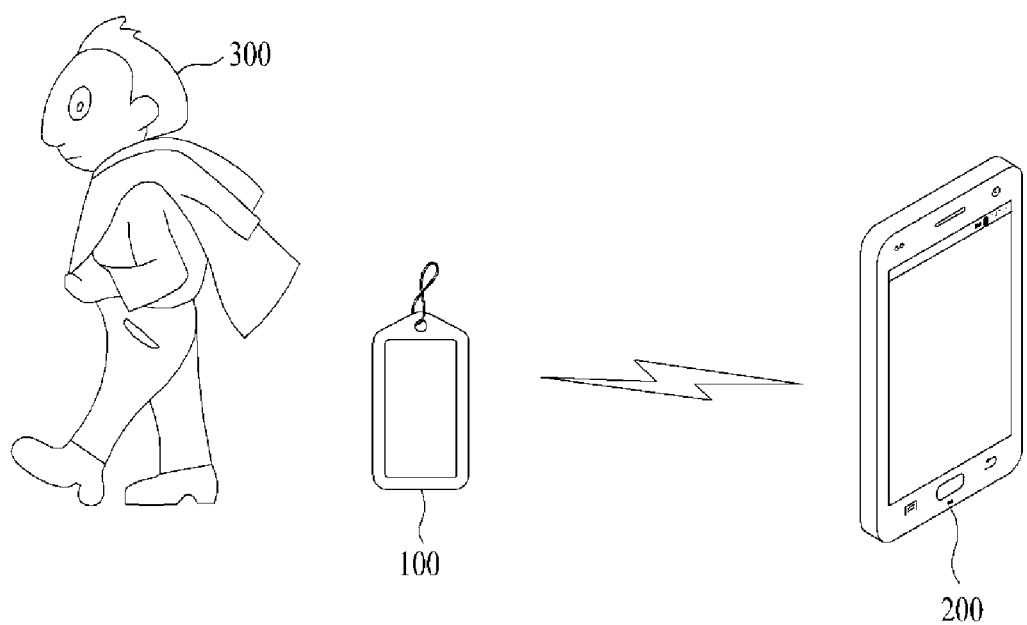
FIG. 1 illustrates an exemplary diagram of a device for preventing mobile phone loss according to the inventive concept.

The features and advantages of the inventive concept, and a method for achieving those will become apparent from the following description of the following embodiments given in conjunction with the accompanying drawings. However, the inventive concept is not limited to the embodiments disclosed below, but may be implemented in various forms. The embodiments of the inventive concept are only provided to make the disclosure of the inventive concept complete and fully inform those skilled in the art to which the inventive concept pertains of the scope of the inventive concept. The inventive concept is only defined by scopes of claim.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other components, steps, operations, and/or elements, in addition to the aforementioned components, steps, operations, and/or elements.

Unless otherwise defined, all terms used herein, including technical or scientific terms, have the same meanings as those generally understood by those skilled in the art to which the inventive concept pertains. Such terms as those defined in a generally used dictionary are not to be interpreted as having ideal or excessively formal meanings unless clearly defined as having such in the inventive concept.

Hereinafter, embodiments of the inventive concept will be described in detail with reference to the accompanying drawings. The same reference numerals denote the same components in the drawings, and redundant descriptions for the same components will be omitted.

Embodiments of the inventive concept deactivates an alarm for preventing mobile phone loss in safe places, for example, a house, a company, inside a vehicle of a user, and the like, pre-registered by the user such that the times of erroneous occurrences of the alarm for preventing mobile phone loss to be provided to the user is reduced.

In this connection, according to the inventive concept, address information or identification (ID) information of WIFI that is connected to the mobile phone in the safe places such as the house, an office, a public place, inside the vehicle, a camping place, or the like predetermined by the user, Bluetooth (BLE) connection information of the vehicle, and location information (GPS information) may be registered. Upon determining that the mobile phone is in the safe place thus registered, the inventive concept deactivates the alarm for preventing the loss. On the other hand, upon determining that the mobile phone is at a place other than in the safe place, the inventive concept activates the alarm for preventing the loss. Therefore, the alarm for preventing the loss may be provided only in a place other than the safe place.

That is, according to the inventive concept, the information of the WIFI that may be connected to the mobile phone in the house, the office, school, the public place, and a place predetermined by the user, the GPS information, the connection information of the BLE that may be connected to the mobile phone in the vehicle, and the like are used to determine whether a place is safe. Therefore, whether to activate or deactivate the alarm for preventing the mobile phone loss may be determined.

Further, according to the inventive concept, in the safe place registered or predetermined by the user, the alarm for preventing the mobile phone loss may not be deactivated. Further, threshold values for volumes of the alarms for preventing the mobile phone loss may be set differently from each other between different safe places. For example, according to the inventive concept, the threshold value for the alarm for preventing the loss may be set to a minimum value at the office so as not to disturb work. Further, the threshold value for the alarm for preventing the loss may be set to a medium value at the house. Further, the threshold value for the alarm for preventing the loss may be set to a threshold value that is smaller than a maximum value by a predetermined value at the camping place, and the like.

Furthermore, the inventive concept may also be applied to prevent loss of an article or to prevent missing child. For example, a tag owned by the mobile phone user may be provided with an alarm for preventing the loss or missing child. Activation and deactivation of this alarm for preventing the loss may be set in the tag itself or through a control of the mobile phone.

According to the inventive concept, upon determining that the tag is at a stationary state for a certain period of time, the alarms for preventing the loss of the mobile phone and the tag are deactivated such that erroneous occurrences of the alarms may be prevented even when the tag and the mobile phone are separated from each other by a certain distance.

Further, according to the inventive concept, another user's mobile phone may be used to activate the alarm for preventing the user's mobile phone loss to control the user's mobile phone such that the alarm for preventing the loss sounds or is output. The location information may be received from the user's mobile phone via the control of the user's mobile phone using another user's mobile phone such that a location of the user's mobile phone may be recognized.

The inventive concept will be described with reference to FIGS. 1 to 5 as follows.

FIG. 1 illustrates an exemplary diagram of a device for preventing mobile phone loss according to the inventive concept.

With reference to FIG. 1, a device for preventing mobile phone loss of the inventive concept may be provided in a mobile phone 200 of a user 300. The device for preventing the mobile phone loss may determine whether to provide an alarm for preventing loss based on distance information between a tag 100 and the mobile phone 200 owned by the user and information about a safe place pre-registered by the user.

In this connection, the tag 100 may be put in a wallet or the like of the user, may include a Bluetooth module (BLE) or the like for generating a beacon, and may provide an alarm for preventing mobile phone loss to the user. In one example, activation and deactivation of the alarm for preventing the mobile phone loss of the tag 100 may be set in the tag itself or may be set through a control of a mobile phone loss prevention device, that is, a control of the mobile phone 200.

The mobile phone having the device for preventing the mobile phone loss, for example, the mobile device 200 such as a smart phone may register or set a safe place in advance through a user input to deactivate the alarm for preventing the loss or to set threshold values for adjusting a volume of the alarm for preventing the loss differently. In one example, information of WIFI that may be connected to the mobile phone at places predetermined by the user such as a house, office, school, and public place, GPS information, connection information of the BLE that may be connected to the mobile phone 200 in a vehicle, or the like may be used to register the safe place. At least one of information of WIFI to which the mobile phone is currently connected, BLE connection information, or GPS information may be compared to the pre-registered WIFI information, GPS information, and BLE connection information in the safe place to determine whether a place is the safe place. Further, when the place is determined as the safe place, the alarm for preventing the mobile phone loss is deactivated to reduce the times of erroneous occurrences of the alarms. In another example, at least one of the information of the WIFI to which the mobile phone is currently connected, the BLE connection information, or the GPS information may be compared to the pre-registered WIFI information, GPS information, and BLE connection information in the safe place to determine whether the place is safe. When the place is determined to as the safe place, a volume of the alarm for preventing the mobile phone loss may be set to a previously set threshold value for a corresponding safe place to provide the alarm for preventing the mobile phone loss. This is a case where only the threshold value is set differently in a state in which the alarm for preventing the mobile phone loss is always activated.

Further, according to the inventive concept, when the mobile phone 200 may not be found in a state in which the alarm for preventing the mobile phone loss is deactivated because the mobile phone 200 is in the safe place, another person's mobile phone may be used to activate the alarm for preventing the user's mobile phone loss, and may be controlled to provide the alarm for preventing the mobile phone loss. Further, the location information of the user's mobile phone may be received from the further person's mobile phone and provided to the user.

In one example, in order for the another person's mobile phone to control the mobile phone loss prevention device provided in the user's mobile phone, a password for a phone number of the pre-registered user mobile phone should be known. The alarm for preventing the mobile phone loss of the user mobile phone may be provided and the location information of the mobile phone may be received through a remote control using the phone number and password of the user's mobile phone.

Figure 2:
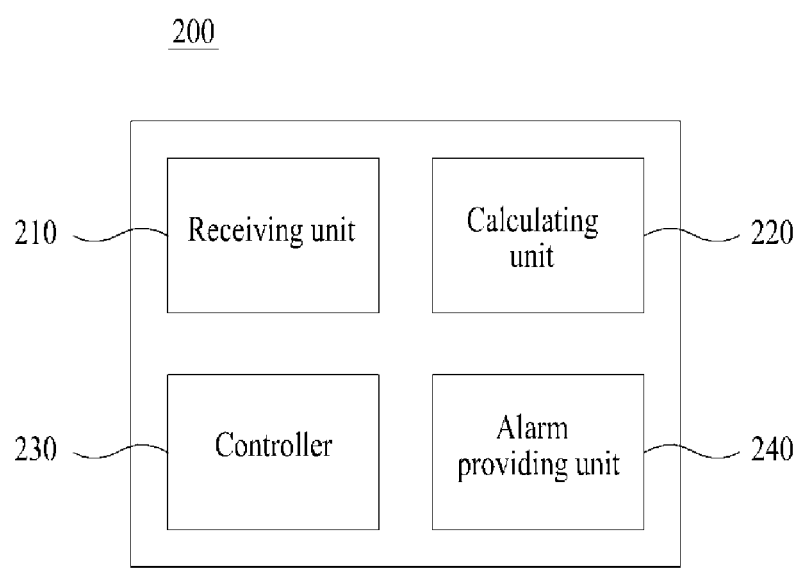
FIG. 2 illustrates a conceptual configuration of a device for preventing mobile phone loss according to an embodiment of the inventive concept.

FIG. 2 illustrates a conceptual configuration of a device for preventing mobile phone loss according to an embodiment of the inventive concept. FIG. 2 is a configuration of the mobile phone loss prevention device provided in the user mobile phone shown in FIG. 1.

With reference to FIG. 2, the device 200 for preventing the mobile phone loss according to an embodiment of the inventive concept includes a receiving unit 210, a calculating unit 220, a controller 230, and an alarm providing unit 240.

The receiving unit 210 receives a beacon signal transmitted from a communication module, for example, Bluetooth of the tag registered in the user's mobile phone. In this connection, the beacon signal may include location information of the tag and information that may calculate distance information from the tag on the mobile phone.

Furthermore, the receiving unit 210 may receive a signal containing the password for remotely controlling the device for preventing the mobile phone loss input via the another user's mobile phone. In this connection, the signal containing the password may be received through a base station, a cloud, or the like.

The calculating unit 220 calculates the distance information between the mobile phone and the tag based on the beacon signal received from the tag.

In this connection, the calculating unit 220 may calculate the distance information between the mobile phone and the tag using various methods for calculating the distance between the mobile phone and the tag using the information contained in the received beacon signal, the information of the mobile phone, and the like.

The controller 230 determines whether the mobile phone is in the predetermined safe place.

In this connection, the controller 230 may pre-register the safe place based on the user input in advance. The controller 230 may register the safe place using the WIFI information for at least one safe place, for example, the address information or identification information of WIFI, the Bluetooth (BLE) connection information, or the GPS information. The controller 230 may compare the information for the safe place thus registered with at least one of the information of the WIFI to which the mobile phone is currently connected, the BLE connection information, or the GPS information to determine whether the place is the safe place.

Furthermore, upon determining that the mobile phone is in the safe place, the controller 230 may deactivate the alarm for preventing the mobile phone loss. The controller 230 may set different threshold values of the volumes of the alarms for preventing the mobile phone loss between different safe places depending on a situation while the alarm for preventing the mobile phone loss is activated.

Furthermore, the controller 230 may determine whether the tag is in a stationary state based on a signal received from the tag, and may deactivate the alarm for preventing the mobile phone loss when the tag is determined to be in the stationary state. For example, the controller may use the signal received from the tag for a certain period of time to determine whether the tag is in the stationary state. When the tag is in the stationary state, it may be determined that the user is in a motionless state or is in a situation not related to the mobile phone loss. Thus, the controller deactivates the alarm for preventing the mobile phone loss.

Figure 3:
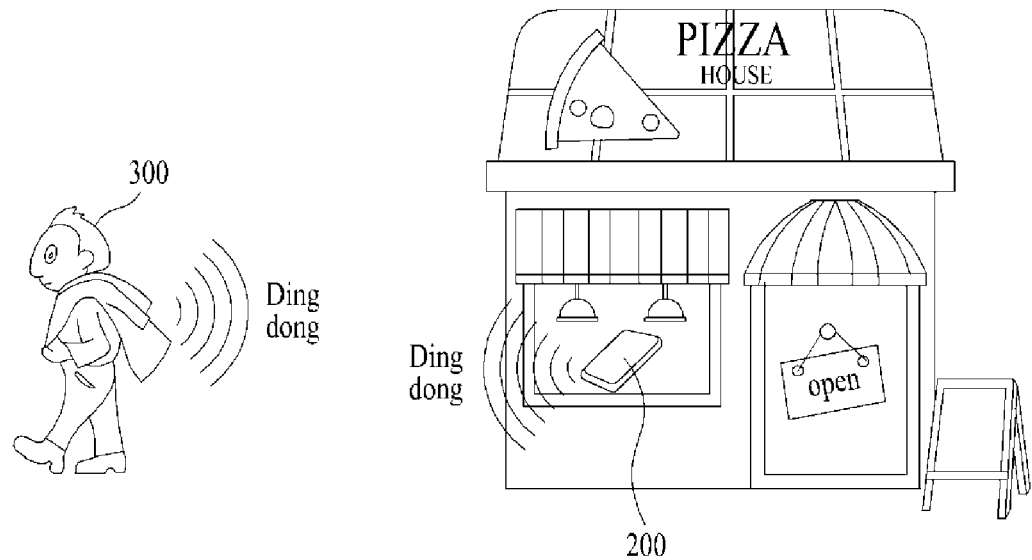
FIG. 3 illustrates an exemplary diagram for describing an operation for a device for preventing mobile phone loss according to the inventive concept.

In one example, when the user mobile phone is in a place other than the safe place, the controller 230 may activate the alarm for preventing the mobile phone loss. For example, as shown in FIG. 3, when a current location of the mobile phone is a pizza shop rather than the safe place, the controller 230 may activate the alarm for preventing the mobile phone loss. Thus, the user having the tag may be prevented from departing from the pizza shop to a distance away from the mobile phone while the mobile phone is left at the pizza shop, thereby preventing the mobile phone loss.

Depending on the situation, the controller 230 may register a plurality of tags and control the calculating unit to calculate a distance between each of the plurality of tags and the mobile phone. In one example, in this case, the controller may control a relationship with each of the plurality of tags, and may set the plurality of tags sequentially to control the calculating unit to calculate the distance from each of the plurality of tags.

The alarm providing unit 240 provides the alarm for preventing the mobile phone loss based on whether the mobile phone is in the safe place and whether the calculated distance is equal to or greater than a predetermined reference distance.

In one example, as shown in FIG. 3, the mobile phone 200 may be at a place other than the safe place, for example the pizza shop, and the user 300 may leave the mobile phone 200 at the pizza shop and move without the mobile phone 200. In this case, when the distance from the tag is greater than or equal to the reference distance, the alarm providing unit 240 may provide the alarm for preventing the mobile phone loss. In this connection, although the tag is not shown in FIG. 3, the user has the tag. Not only the mobile phone 200 provides the alarm for preventing the mobile phone loss by the alarm providing unit 240 but also the tag provides the alarm for preventing the mobile phone loss together. Thus, the user may recognize that the user has left the mobile phone 200 at the pizza shop.

In another example, when the mobile phone is in the safe place, the alarm for preventing the mobile phone loss is deactivated such that the alarm providing unit 240 does not provide the alarm for preventing the mobile phone loss. When the mobile phone is in the safe place and the calculated distance is equal to or greater than the reference distance, the alarm providing unit 240 may provide alarms for preventing the loss to have volumes of different threshold values between different safe places.

According to the inventive concept, when the mobile phone may not be found in a state in which the alarm for preventing the mobile phone loss is deactivated because the mobile phone is in the safe place, the device for preventing the mobile phone loss may use another person's mobile phone to activate the alarm for preventing the user's mobile phone loss, and may control the another person's mobile phone to provide the alarm for preventing the mobile phone loss. Further, the location information of the user mobile phone may be received from another person's mobile phone and provided to the user.

Figure 4:
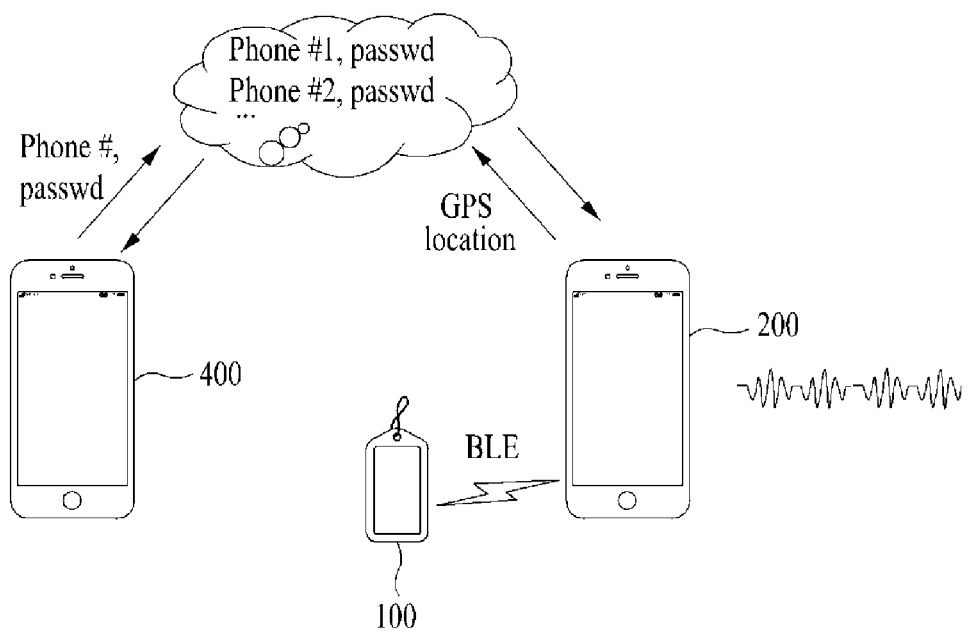
FIG. 4 illustrates another exemplary diagram for describing an operation for a device for preventing mobile phone loss according to the inventive concept.

For example, another user's mobile phone 400 of the user as shown in FIG. 4 may use the phone number of the user's mobile phone 200 and the mobile phone loss prevention device provided in the user's mobile phone 200 to control the activation and output of the alarm for preventing the mobile phone loss. To this end, a predetermined password (PASSWD) may be transmitted through a network using an application according to the inventive concept such that a signal containing the password is transmitted to the user mobile phone 200. Further, the user mobile phone 200 determines whether the passwords match. When the passwords match, the alarm for preventing the mobile phone loss may be output through a speaker. In addition, the location information of the user mobile phone 200, that is, the GPS information, is transmitted to the mobile phone 400 of another user through the network such that the mobile phone 400 of the another user may recognize the precise location of the user's mobile phone 200. In one example, the user mobile phone 200 may also activate the alarm for preventing the mobile phone loss of the tag 100 connected to the user mobile phone, and allow the alarm for preventing the mobile phone loss to be output through the tag 100. This function shown in FIG. 4 may be controlled by the controller configured in FIG. 2.

In this connection, the network is a communication network that connects the mobile phones 200 and 400. The network may include not only a communication network such as a mobile communication network, a wired internet, a wireless internet, and a broadcasting network but also a short-range wireless communication protocol between devices. For example, the network may include at least one of a personal area network (PAN), a local area network (LAN), a campus area network (CAN), a metropolitan area network (MAN), a wide area network (WAN), a broadband network (BBN), an internet, or the like. The network may also include at least one network topology of a bus network, a star network, a ring network, a mesh network, a star-bus network, a tree, a hierarchical network, or the like, but is not limited thereto.

Likewise, the device or system for preventing the mobile phone loss according to the embodiment of the inventive concept deactivates the alarm for preventing the mobile phone loss in the safe place pre-registered by the user, for example, the house, company, inside the vehicle, and the like. Thus, the times of erroneous occurrence of the alarm for preventing the mobile phone loss to be provided to the user may be reduced.

Further, the device or system for preventing the mobile phone loss according to the embodiment of the inventive concept reduces the times of erroneous occurrence of the alarm for preventing the mobile phone loss such that inconvenience of the user, which may be caused by the false alarm may be eliminated.

Figure 5:
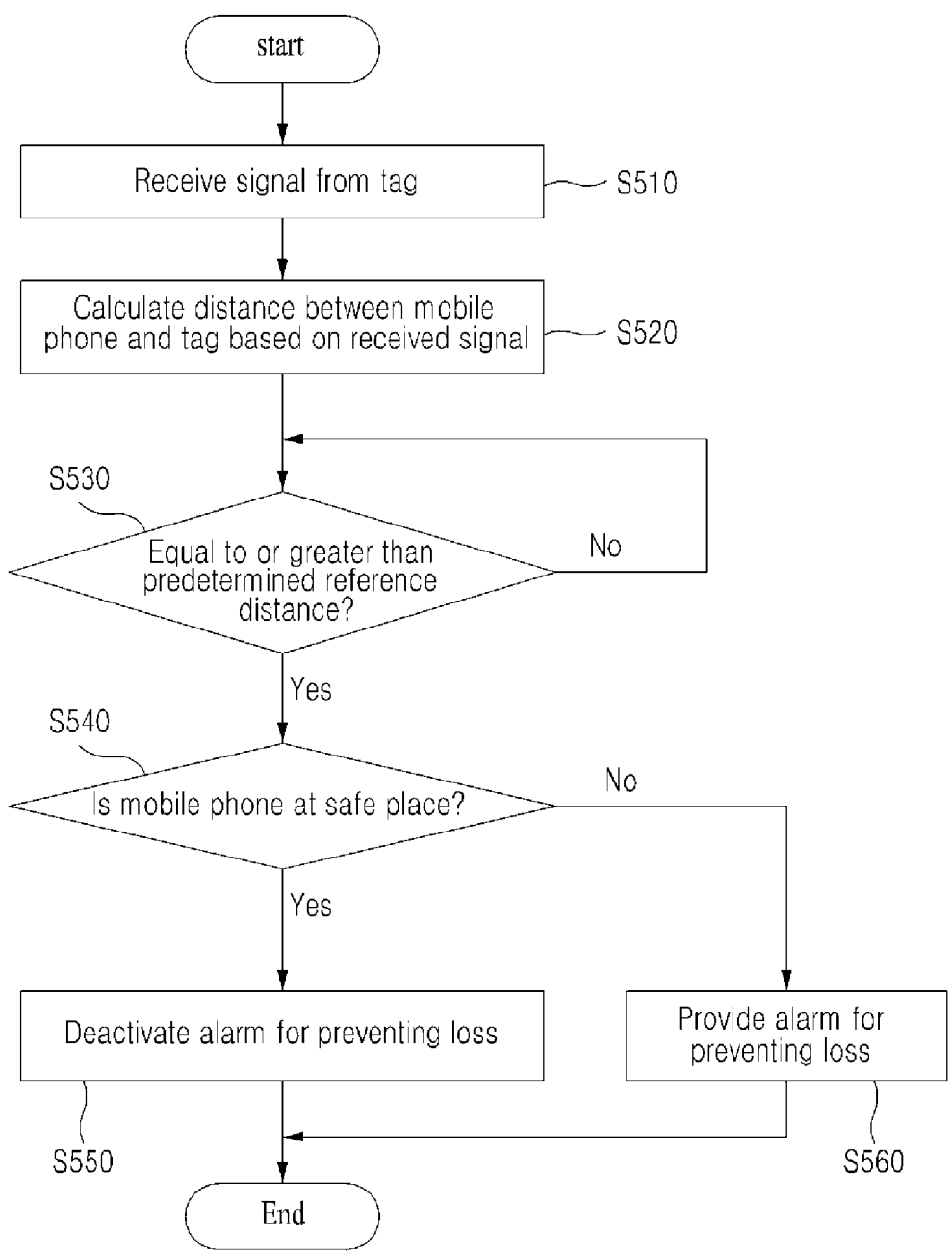
FIG. 5 is a flowchart of a mobile phone loss prevention service method according to an embodiment of the inventive concept.

FIG. 5 is a flowchart of a mobile phone loss prevention service method according to an embodiment of the inventive concept. FIG. 5 illustrates a flowchart of the mobile phone loss prevention device in FIG. 2.

With reference to FIG. 5, a mobile phone loss prevention service method according to one embodiment of the inventive concept includes receiving the signal, for example, the beacon signal, transmitted from the tag connected to the user's mobile phone, and calculating the distance between the mobile phone and the tag based on the signal received from the tag (S510 and S520).

Upon determining that the distance from the tag calculated in S520 is equal to or greater than a predetermined reference distance, and determining that the mobile phone is in the safe place, the alarm for preventing the loss is deactivated such that the alarm for the preventing the phone loss is prevented from being provided in the safe place. Upon determining that the distance from the tag calculated in S520 is equal to or greater than the predetermined reference distance, and determining that the mobile phone is at a place other than the safe place, the alarm for preventing the loss is activated, and is output through the speaker such that the mobile phone loss may be prevented (S530 to S560).

In this connection, in operation S540, the WIFI information for the safe place pre-registered by the user, for example, the address information or the identification (ID) information of the WIFI, Bluetooth (BLE) connection information, and the GPS information may be compared with at least one of the information of the WIFI to which the mobile phone is currently connected, the BLE connection information, or the GPS information to determine whether the place is safe.

Although it is shown that the determination of whether the mobile phone is in the safe place is performed after S530 in FIG. 5, the determination of whether the mobile phone is in the safe place may be performed before S510, or may be performed before or after S520.

Furthermore, when the mobile phone is in the safe place, the method according to the inventive concept may differently set the threshold values of the volumes of the alarms for preventing the loss between the different safe places in a state in which the alarm for preventing the mobile phone loss is activated without being deactivated. Further, the method may use the threshold value thus set to provide the alarm for preventing the loss to the corresponding safe place. In one example, even in this case, the distance from the tag may be equal to or greater than a certain distance.

Although a description thereof is omitted in the method of FIG. 5, each operation constituting FIG. 5 may include all of the contents described in FIGS. 1 to 4, which will be apparent to those skilled in the art.

The foregoing devices may be realized by hardware elements, software elements and/or combinations thereof. For example, the devices and components illustrated in the exemplary embodiments may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implementations, other embodiments, and equivalents to the claims are within the scope of the following claims.

According to embodiments of the inventive concept, the alarm for preventing the mobile phone loss may be deactivated in the safe places pre-registered by the user such as the house, company, inside the vehicle of the user, and the like to reduce the times of erroneous occurrence of the alarm for preventing the mobile phone loss According to embodiments of the inventive concept, the times of erroneous occurrence of the alarm for preventing the mobile phone loss may be reduced in the safe places such that the user inconvenience that may be caused by the false alarm may be eliminated.

The inventive concept may be applied to prevent the mobile phone loss but also to various services such as prevention of missing children and the like by attaching the tag to children.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A device for preventing mobile phone loss, the device comprising:
    a receiving unit configured to receive a predetermined signal from a pre-registered tag;
    a calculating unit configured to calculate a distance between a mobile phone and the tag based on the received signal;
    a controller configured to determine whether the mobile phone is in a predetermined safe place; and
    an alarm providing unit configured to provide an alarm for preventing the mobile phone loss based on whether the mobile phone is in the safe place and whether the calculated distance is equal to or greater than a predetermined reference distance,
    wherein the controller sets different threshold values of volumes of alarms for preventing the mobile phone loss between at least two safe places,
    wherein when the mobile phone is determined to be in the at least two safe places, the controller keeps activating the alarm for preventing the mobile phone loss, and
    wherein when the calculated distance is equal to or greater than the predetermined reference distance, the alarm providing unit provides a corresponding alarm at a volume of a threshold value set for a corresponding safe place.

2. The device of claim 1, wherein the controller determines whether the mobile phone is in the safe place based on at least one of address information or identification (ID) information of WIFI, Bluetooth connection information, or location information pre-registered by a user of the mobile phone.

3. The device of claim 1, wherein when the mobile phone is determined to be in a place other than the safe place, and the calculated distance is equal to or greater than the predetermined reference distance, the alarm providing unit provides the alarm for preventing the mobile phone loss.

4. The device of claim 1, wherein the controller determines whether the tag is in a stationary state based on the signal received from the tag for a predetermined time,
    wherein, when the tag is determined to be in the stationary state, the controller deactivates the alarm for preventing the mobile phone loss.

5. The device of claim 1, wherein when the controller receives a predetermined password about the mobile phone from another mobile phone, the controller activates the alarm for preventing the mobile phone loss to provide the alarm for preventing the mobile phone loss using the alarm providing unit.

6. The device of claim 5, wherein the controller provides location information of the mobile phone to the another mobile phone.

* * * * *